(12) United States Patent
Helbig et al.

(10) Patent No.: US 9,239,064 B2
(45) Date of Patent: Jan. 19, 2016

(54) FAIL-SAFE ACTUATION SYSTEM

(75) Inventors: Achim Helbig, Stuttgart (DE);
Christoph Boes, Reutlingen (DE);
Werner Handle, Marbach am Neckar (DE)

(73) Assignee: Moog GmbH, Boblingen (DE)

( * ) Notice: Subject to any disclaimer, the term of this patent is extended or adjusted under 35 U.S.C. 154(b) by 424 days.

(21) Appl. No.: 13/992,441

(22) PCT Filed: Dec. 8, 2011

(86) PCT No.: PCT/EP2011/006187
§ 371 (c)(1),
(2), (4) Date: Oct. 2, 2013

(87) PCT Pub. No.: WO2012/076178
PCT Pub. Date: Jun. 14, 2012

(65) Prior Publication Data
US 2014/0026969 A1  Jan. 30, 2014

(30) Foreign Application Priority Data
Dec. 8, 2010  (DE) .......................... 10 2010 053 811

(51) Int. Cl.
*F16D 31/02* (2006.01)
*F15B 1/02* (2006.01)
(Continued)

(52) U.S. Cl.
CPC .............. *F15B 1/022* (2013.01); *F03D 7/0224* (2013.01); *F03D 7/04* (2013.01); *F15B 15/17* (2013.01);
(Continued)

(58) Field of Classification Search
CPC .......... F15B 1/022; F15B 15/17; F15B 15/18; F15B 20/002; F15B 20/004
USPC .................................. 60/404, 406
See application file for complete search history.

(56) References Cited

U.S. PATENT DOCUMENTS

| 4,046,270 A | 9/1977 | Baron |
| 4,738,101 A | 4/1988 | Kubik |

(Continued)

FOREIGN PATENT DOCUMENTS

| DE | 12 51 158 B | 9/1967 |
| DE | 10 2004 045011 A1 | 4/2006 |

(Continued)

OTHER PUBLICATIONS

The International Search Report (ISR) for International Application No. PCT/EP2011/006187; Publication No. WO 2012/076178 A1; dated Mar. 29, 2012 (English translation).

(Continued)

*Primary Examiner* — Michael Leslie
(74) *Attorney, Agent, or Firm* — Phillips Lytle LLP

(57) ABSTRACT

Disclosed is a fail-safe fluidic actuation system (1) having a safety position, comprising a control element (2) having at least one first and one second chamber (3, 4); having a working circuit (5) with a motor/pump device (6), wherein the control element can be actuated by means of the working circuit at least in the operational state. Furthermore, the actuating system comprises a discharge valve (9) which, in a failure state, is placed into a pass-through position in order to discharge fluid from the second chamber, and the safety circuit is designed such that, in the operational state, an inflow decoupled from the store can be generated into the control element by means of the working circuit with the motor/pump device, wherein by means of the safety circuit, in a failure state, an inflow fully decoupled from the working circuit with the motor/pump device is provided into the first chamber by means of the store, wherein the control element has three chambers, and wherein the safety circuit is designed such that, in the operational state, an inflow decoupled from the store can be generated into the third chamber (15) by means of the working circuit with the motor/pump device.

15 Claims, 9 Drawing Sheets

Figure 1:
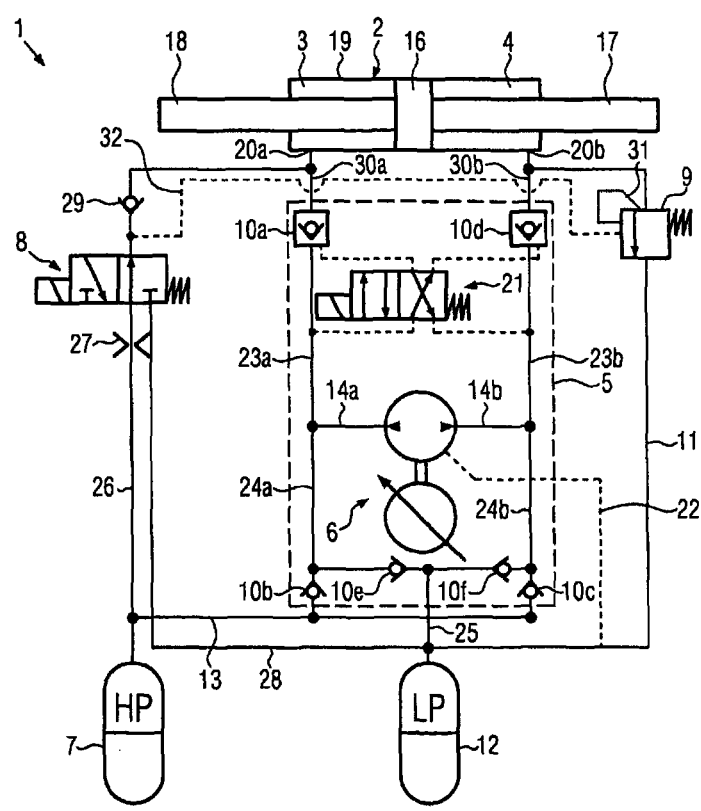

(51) Int. Cl.
*F15B 20/00* (2006.01)
*G05D 16/20* (2006.01)
*F03D 7/02* (2006.01)
*F03D 7/04* (2006.01)
*F15B 15/17* (2006.01)

(52) U.S. Cl.
CPC ............ *F15B 20/002* (2013.01); *F15B 20/004* (2013.01); *G05D 16/20* (2013.01); *F05B 2260/406* (2013.01); *F05B 2260/79* (2013.01); *F15B 2211/212* (2013.01); *F15B 2211/27* (2013.01); *F15B 2211/30515* (2013.01); *F15B 2211/31558* (2013.01); *F15B 2211/329* (2013.01); *F15B 2211/50518* (2013.01); *F15B 2211/5159* (2013.01); *F15B 2211/7053* (2013.01); *F15B 2211/7054* (2013.01); *F15B 2211/7055* (2013.01); *F15B 2211/785* (2013.01); *F15B 2211/8633* (2013.01); *F15B 2211/8752* (2013.01); *Y10T 137/0324* (2015.04); *Y10T 137/7761* (2015.04)

(56) References Cited

U.S. PATENT DOCUMENTS

| | | |
|---|---|---|
| 5,301,505 A | 4/1994 | Wright |
| 5,778,669 A | 7/1998 | Kubik |
| 2007/0227133 A1 | 10/2007 | Aarestad |

FOREIGN PATENT DOCUMENTS

| | | |
|---|---|---|
| EP | 1498614 A1 | 9/2005 |
| WO | 2009064264 A1 | 5/2009 |

OTHER PUBLICATIONS (IPEA/409) The International Preliminary Report on Patentability Chapter II for International Application No. PCT/EP2011/006187; Publication No. WO 2012/076178 A1; dated Mar. 13, 2013 (English Translation).

The Written Opinion of the International Search Authority for International Application No. PCT/EP2011/006187; Publication No. WO 2012/076178 A1.

FAIL-SAFE ACTUATION SYSTEM

The invention relates to a fail-safe actuation system having a safety position, comprising a control element with at least a first and a second chamber, comprising a working circuit with a motor/pump device, whereby the control element can be actuated by means of the working circuit, at least in the operative state, and comprising a safety circuit by means of which, in a failure state, the control element can be moved into the safety position, whereby the safety circuit has a tank that holds pressurized fluid and that, in the failure state, is automatically connected to the first chamber via an on-off valve, and it has a drain valve that, in the failure state, is moved into the through-flow position in order to drain fluid out of the second chamber, and the safety circuit is configured in such a way that, in the operative state, an inflow into the control element—in a manner that is completely decoupled from the tank—can be established by means of the working circuit with its motor/pump device and, in the failure state, an inflow from the tank into the first chamber—in a manner that is completely decoupled from the working circuit with its motor/pump device—is created by means of the safety circuit.

Such actuation systems are used, for example, in order to actuate hydraulic or pneumatic pistons and to move them into a desired position. Normally, these are safety-relevant applications. Consequently, it is necessary to use an actuation system with a safety position, whereby, in case of a failure of the actuation system, the safety circuit moves the control element into a safe position, that is to say, the safety position.

Such an application could be, for instance, the blade adjustment of a wind turbine. In this application, it has to be ensured that a safety function is provided if the regular adjustment system fails. It has to make it possible to adjust the rotor blades in such a way that no uncontrollable operative states can occur. It would be likewise conceivable to use such actuation systems for gas, steam or water turbines as well as for applications in the oil and gas industries, where control elements are likewise employed which, in case of a failure, have to be safely and reliably moved into a prescribed position. Such control elements could be, for example, hydraulic pistons or safety valves.

International patent application WO 2009/064264 A1 discloses an electro-hydraulic circuit used to set the angle of attack of at least one rotor blade of a wind turbine. The circuit comprises a motor that drives a pump. The hydraulic circuit is supplied with fluid from a tank or reservoir that can be pumped into a first or second chamber of a hydraulic piston by means of the pump. The direction of rotation of the pump is variable, whereby, in a first direction of rotation, fluid is pumped into one of the chambers, and the fluid displaced out of the other chamber is directed to the suction side of the pump and is likewise conveyed to the chamber that is to be filled. The hydraulic circuit also comprises a pressure tank that is filled with hydraulic fluid and that is connected to the hydraulic circuit via a spring-loaded valve. During the regular operative state, the tank is closed by the valve and is thus decoupled from the hydraulic circuit. In case of a failure, for example, a power failure, the spring-loaded valve is moved into the through-flow position, as a result of which the hydraulic fluid stored under pressure in the tank enters the circuit. The valves, which are positioned in the feed lines of the two chambers of the hydraulic piston, are moved into the through-flow position by means of spring force. The hydraulic fluid stored in the pressure tank then flows through the hydraulic circuit into both chambers of the hydraulic piston. In this process, the fluid flows out of the tank into the working circuit, that is to say, into the circuit that supplies the piston with fluid during regular operation. The fluid can flow via two routes through the working circuit in the direction of the chamber of the piston that is to be filled, namely, through the pump and/or through a line in which there is a throttle as well as an on-off valve that is open in the failure state.

The hydraulic piston is configured as a so-called differential piston, which is why, in spite of the fact that the pressure in the two chambers is identical, a greater force is exerted on the larger of the two piston surfaces, causing a corresponding movement of the piston into the safe position.

The drawback here is that, if the pump is blocked or if the line or the circuit elements are defective, this circuit cannot ensure a fail-safe function.

A fail-safe actuation system of this generic type is known, for example, from U.S. Pat. No. 5,301,505. A pressure tank is used so that the cylinder that can be actuated by two chambers can be moved into a safety position. A comparable construction is also disclosed in European patent application EP 1498614 A1.

Therefore, it is the objective of the invention to provide a fluid-based actuation system that, in the failure state, can reliably assume a prescribed safety position.

For this purpose, it is put forward according to the invention to provide a generic fail-safe fluid-based actuation system with a safety position, whereby, in this system, the control element has three chambers, whereby the safety circuit is configured in such a way that, in the operative state, an inflow into the third chamber—in a manner that is decoupled from the tank—can be established by means of the working circuit with its motor/pump device. In this configuration, an inflow from the tank into the first chamber—in a manner that is completely decoupled from the working circuit—is established in the failure state as well as in the operative state. Hence, the third chamber brings about a decoupling. The first chamber is only connected to the tank. The second chamber is only connected to the working circuit. The third chamber is connected to the working circuit as well as to the drain line. The inflows into the control element coming from the tank as well as from the working circuit are completely decoupled by means of separate fluid lines into the appertaining chamber of the control element.

Such an actuation system can be used, in the failure state, to move the control element into the safety position, that is to say, into the position in which a device or system is exposed to the smallest possible risks or in which the smallest possible risks are posed by this device or system. A commonly encountered failure state could be, for example, a power failure that puts an electrically powered motor/pump device out of operation and thus also renders the working circuit non-operative. During regular operation, that is to say, in the operative state, the working circuit serves to supply fluid to the control element. For this purpose, the working circuit has a motor/pump device by means of which the individual chambers of the control element are supplied with fluid. The term motor/pump device refers to any device that can generate a flow of fluid. Normally, this is a drive motor that is coupled to a fluid pump.

Moreover, the actuation system has a safety circuit that is provided in addition to the working circuit. The safety circuit is configured to move the control element into the safety position in a failure state. Fundamentally, the safety position can also be assumed by means of the working circuit, for example, if routine maintenance work is to be done on the system. By means of the safety circuit, however, an additional, that is to say, redundant, possibility for assuming the safety position exists if the working circuit in the failure state is not able to take over this function. For this purpose, the safety circuit is configured in such a way that an inflow of fluid that goes into the first chamber of the control element and that is triggered by the tank bypasses all of the functional elements of the working circuit and does not have to flow through these elements. The term functional elements or functional parts refers to moved or moving elements or switchable elements.

The safety circuit has a tank that contains a pressurized fluid and that, in the failure state, is configured to be connected to the first chamber of the control element and to supply it with fluid. For this purpose, an on-off valve is provided that, during the operative state, is in the blocking position and that, in the failure state, automatically moves into a through-flow position and establishes the fluid communication with the first chamber. Such an automatic switching function of a valve can be achieved, for example, by means of a valve that is pretensioned by a spring. Furthermore, the safety circuit comprises a drain valve that, in the failure state, can drain fluid that is present in the second chamber, thus allowing a movement of the control element, for instance, a hydraulic piston. The through-flow position of the drain valve is to be understood to mean that the drain valve can be in a blocking position in order to block, i.e. to prevent, a flow in the line in which the drain valve is situated, and it can be in the through-flow position in order to permit a flow in the line. Preferably, the drain valve is a switchable valve. The drain valve can be configured as a pre-actuated or forced-actuated valve.

The safety circuit is configured in such a way that the tank is not in fluid communication with the first chamber during the regular operative state. Consequently, as a rule, the tank is decoupled from the control element during the operative state, so that an inflow into the control element during the operative state is only possible with the working circuit with its motor/pump device. Moreover, this configuration of the actuation system creates an inflow that is completely decoupled from the working circuit, that is to say, a structurally separated inflow from the tank into the first chamber of the control element in the failure state. The fluid stored in the tank can thus be conveyed directly into the first chamber, that is to say, without a detour through the working circuit or functional parts thereof. Consequently, in case of a leak in the working circuit, the safety position of the control element can also be reliably reached since the fluid present in the tank is conveyed into the first chamber via the lines of the safety circuit and not via the elements of the working circuit.

The statement that, in the failure state, the safety circuit establishes an inflow from the tank into the first chamber—in a manner that is completely decoupled from the working circuit with its motor/pump device—especially means that, in the failure state, the safety circuit creates an inflow from the tank into the first chamber—in a manner that bypasses the working circuit with its motor/pump device—in the form of a bypass.

When the term circuit is used, this refers not only to active circuit elements such as, for example, valves, but rather also to the associated lines and other elements of the type commonly found in hydraulic circuits or in general fluid-based systems.

The term "completely decoupled inflow" means that the safety circuit is configured in such a way that structural measures have been taken to prevent fluid that is conveyed from the tank into the control element from being lost, for instance, due to damage in the working circuit. For this purpose, the working circuit or the connection area of the working circuit and the safety circuit is configured in such a way that, in the failure state, a flow of fluid from the tank into the safety circuit is prevented.

The statement that the safety circuit is configured in such a way that, in the operative state, an inflow into the control element—in a manner that is decoupled from the tank—can be established by means of the working circuit with its motor/pump device means that structural measures have been taken that, in the operative state, permit an inflow into the control element separately from the tank. Normally, in the operative state, the inflow from the tank into the control element is prevented, that is to say, decoupled. Preferably, the decoupled inflow into the control element can be adjusted, that is to say, it can be selected, so that, in the failure state, an inflow from the tank into the control element can be established by means of the working circuit, and so that, in the operative state, the inflow from the tank into the control element can be terminated by the working circuit.

Accordingly, it is the case that the possibility fundamentally exists to convey fluid when the working circuit is operative and likewise to feed fluid from the tank, that is to say, from the safety circuit, in order to move the control element into a safety position by means of these combined flows of fluid. However, if the working circuit is inoperative, then, due to the completely decoupled inflow into the first chamber, the tank is able to feed in fluid and move the control element into the safety position.

According to one variant, in the failure state, in order to completely decouple the safety circuit from the working circuit, at least one valve element can also be provided that prevents a fluid communication between the fluid released from the tank and the fluid present in the working circuit. Thus, in order to prevent a loss of fluid from the tank and to ensure that the greatest possible quantity of fluid from the tank is available for moving the control element into the safety position, a valve element is used that prevents a fluid communication between the safety circuit and the working circuit. Therefore, the minimum requirements made of the valve element are that, in the failure state, it should prevent at least a flow or fluid communication into the working circuit. This could be carried out using a check valve or a pilot-controlled check valve. The valve element is preferably arranged in such a way that all of the functional elements of the working circuit are decoupled from the safety circuit and nevertheless, that all of the connected line harnesses can be used together by the fluid being conveyed out of the tank as well as from the working circuit.

It can also be provided that the drain valve is configured and actuated in such a way that, in the failure state, a fluid pressure from the tank is available as a control pressure at the drain valve. In this way, it is ensured that, in the failure state, as a rule, the drain valve is also open when the on-off valve is open and when there is pressure in the tank. In this way, fluid from the tank can be fed into a chamber of the control element and, at the same time, fluid can be drained from another chamber. Accordingly, the volume of the one chamber increases and the volume of the other chamber decreases. The circuit is configured in such a way that, in the failure state, the control pressure is only present at the drain valve. Preferably, it is provided that the control pressure is only present when the on-off valve is open.

Such a circuit can be constructed in that a fluid-filled line is connected to the drain valve and, in the failure state, this line is exposed to the pressure from the tank. The pressure applied from the tank then presses the fluid in the control line against the drain valve, which then opens.

As an alternative, however, there is also the possibility that the drain valve is configured and actuated in such a way that, in the failure state, the drain valve is forced open, preferably mechanically or electrically, by means of the on-off valve. In this context, there is also the possibility to integrate this function into the on-off valve itself, so that, during a corresponding switching process of the on-off valve, the drain valve is also forced open.

Furthermore, it can be provided that the safety circuit comprises a drain line which is connected to the second chamber of the control element and in which the drain valve is situated, whereby the drain line is completely decoupled from the tank. If the control element is configured as a differential piston, in case of a failure, the differential effect, that is to say, the normally occurring automatic speed regulation of differential pistons, is rendered inoperative due to the structural separation of the inflow and the outflow. This creates the possibility to influence the movement speed of the control element when it is being moved into the safety position in the failure state. This can be done, for example, by means of the selected through-flow cross section of the tank line or drain line or else by means of a throttle in these lines.

The drain line serves to drain or discharge fluid from the second chamber in the failure state. The drain valve is positioned in the drain line, preferably near the control element. The drain line is completely decoupled from the tank, that is to say, structurally configured and positioned in such a way that it is not possible for fluid from the tank to mix with fluid in the drain line, and fluid from the tank cannot be fed into the drain line.

Moreover, it can be provided that the drain line bypasses the working circuit. This permits an outflow from the chamber or the controlled outflow of fluid from the control element, even if the working circuit is damaged and a drain element in the working circuit cannot be actuated. Consequently, the drain line and thus also the drain valve are redundant with respect to the working circuit in terms of the drainage function. Preferably, the drain line is designed and configured in such a way that, in the failure state, fluid that is drained from the control element only flows into the drain line, and fluid from the control element is prevented from mixing with fluid in the working circuit. The drain line forms a drainage path that bypasses the working circuit.

As another alternative, it can be provided that a tank, that is to say, a reservoir, is provided to hold fluid, and the drain line opens up into the reservoir downstream from the drain valve. The reservoir serves to hold fluid and to release it into the actuation system as well as to receive it from the actuation system. At least the drain line opens up into the reservoir and is connected to it.

As another embodiment, it is conceivable that the working circuit is in fluid communication with the reservoir via which fluid from the reservoir can be conveyed into the working circuit. For this purpose, the actuation system has a reservoir line that connects the working circuit with the reservoir. The working circuit can draw in fluid from the reservoir via this reservoir line.

Moreover, a filling line can be provided by means of which the fluid from the working circuit can be fed into the tank, whereby the tank is decoupled from the working circuit by means of at least one valve element that prevents fluid from flowing back into the working circuit. The filling line makes it possible to pump fluid from the working circuit into the tank. For this purpose, the motor/pump device pressurizes the fluid and conveys it via the filling line into the tank. In order to rule out a pressure loss in the tank and in order to prevent a backflow of fluid into the working circuit, a valve element that prevents a backflow of fluid into the working circuit is provided in order to decouple the tank from the working circuit. Such a valve element can be, for example, a check valve or a valve that, at least in the failure state, closes automatically. Such a configuration also has the advantage that, in the operative state, after the tank has been filled, it is decoupled from the working circuit, and the stored pressure cannot escape. This means that, even in case of a pressure loss in the working circuit, the pressure in the tank is maintained and, after the pressure has built up again in the working circuit, there is no need to fill the tank again. The pressure stored in the tank is thus always available to move the control element into the safety position if a failure state occurs. Moreover, in the operative state, the valve element makes it possible to work with fluid pressures that are less than the pressure in the tank.

It is conceivable that, in the operative state, when the motor/pump device is standing still, a flow of fluid from the chambers that are connected to the working circuit is prevented by means of at least one valve element. This makes it possible to bring the control element into a desired position and to maintain this position, even when the working circuit has been switched off, that is to say, even when the motor/pump device is switched off. In order to make such a blocking state possible, the flow from the control element is blocked. This is achieved in that at least one valve is provided that prevents a flow into the working circuit. Moreover, a drain valve can be provided that, during the blocking state, prevents a flow from the control element into the drain line. By the same token, a blocking element can be provided that, at least in the blocking state, prevents a flow from the control element in the direction of the tank.

Moreover, the at least one valve element is configured in such a way that, at least in the failure state, it blocks a through-flow in one direction. Thus, if an element of the actuation system is referred to as a valve element, this is to be understood as an element that is configured so that, at least in the failure state, it blocks a through-flow in one direction. In this context, the valve element can be configured so that, only in the failure state, it blocks a through-flow in one direction or else so that it does so in the failure state as well as the in operative state. Moreover, it can be provided that the valve element is configured to be switchable, so that, depending on the operating conditions, it blocks a through-flow in one direction during a first operative state, and it does not permit a through-flow in either direction in a second operative state, and it blocks the through-flow in one direction in the failure state. Preferably, the valve element is configured so that, in the failure state, it automatically blocks the through-flow in one direction. Examples of valve elements that can be used include check valves, pilot-controlled check valves, or spring-loaded on-off valves. Preferably, the direction in which a through-flow is blocked is the direction from the tank to the working circuit. Moreover, the possibility should also exist to block a flow in the direction from the control element toward the working circuit so that only a flow into the drain line is possible.

In one embodiment, it can be provided that the motor/pump device has a first and a second connecting line, whereby, in the operative state, one of the connecting lines conveys fluid in the direction of a chamber of the control element while the other connecting line conveys fluid from the direction of the at least one other chamber of the control element to the motor/pump device. Accordingly, the motor/pump device has two connecting lines, whereby one connecting line serves as a feed line and the second connecting line serves as a drain line. In this process, one of the connecting lines conveys fluid in the direction of a chamber of the control element, whereas the other connecting line conveys fluid from the direction of the other chamber of the control element to the motor/pump device. As a result, fluid that is displaced from one chamber is, at least in part, conveyed directly to the motor/pump device and directly into the other chamber. Thus, fluid that is displaced from one chamber is preferably not conveyed into the reservoir from where it then has to be drawn in once again by the pump. This means that a smaller volume is needed in the actuation system, the reservoir can have a smaller configuration, and correspondingly less installation space is needed for the actuation system.

Moreover, it can be provided that the working circuit has a motor/pump device with a reversible pumping direction, whereby in a first pumping direction of the motor/pump device, the first connecting line conveys fluid in the direction of a chamber of the control element, while the second connecting line conveys fluid from the direction of the at least one other chamber of the control element to the motor/pump device, and in the second pumping direction, the flow directions in the first and second connecting lines are opposite from the flow directions in the case of the first direction of rotation. Consequently, the connecting lines are configured to convey fluid in one direction as well as in another direction. This makes it possible to pump fluid from one chamber directly into another chamber by means of the pump, whereby in the reverse direction of rotation or reverse pumping direction, a pumping procedure in the opposite direction is also possible. This makes it possible to effectuate a movement of the control element in one direction in that the motor/pump device pumps in one pumping direction and to effectuate another movement direction of the control element in that the motor/pump device pumps in the other direction. The pumping direction can be reversed by means of a motor/pump device with a variable direction of rotation or by means of other structural measures that bring about a reversal of the pumping direction. Thus, for example, adjustable axial and radial piston pumps are known that permit a reversal of the pumping direction, even when the direction of rotation remains the same.

In another variant, the working circuit comprises a speed-variable constant-displacement pump or variable-displacement pump. The variably selectable rotational speed of the pump can be used to set the desired displacement capacity or the desired pressure. The possibility exists to use a speed-variable constant-displacement pump as well as a variable-displacement pump. As an alternative, however, it is fundamentally also possible to use a variable-displacement pump that runs at a constant speed.

Moreover, another alternative invention is disclosed that can also be separated out within the scope of a divisional application. It refers to a fail-safe fluid-based actuation system (1) having a safety position, comprising a control element (2) with at least a first and a second chamber (3, 4), comprising a working circuit (5) with a motor/pump device (6), whereby the control element (2) can be actuated by means of the working circuit (5), at least in the operative state, and comprising a safety circuit by means of which, in a failure state, the control element (2) can be moved into the safety position, whereby the safety circuit has a tank (7) that holds pressurized fluid and that, in the failure state, is automatically connected to the first chamber (3) via an on-off valve (8), and it has a drain valve (9) that, in the failure state, is moved into the through-flow position in order to drain fluid out of the second chamber (4), and the safety circuit is configured in such a way that, in the operative state, an inflow into the control element (2)—in a manner that is completely decoupled from the tank—can be established by means of the working circuit with its motor/pump device and, in the failure state, an inflow from the tank (7) into the first chamber (3)—in a manner that is completely decoupled from the working circuit with its motor/pump device (6)—is created by means of the safety circuit, characterized in that a short-circuit fluid connection is provided between the first and second chambers (3, 4) that, in the failure state, is through-connected in order to generate a short-circuit flow between the first and second chambers (3, 4).

This switchable short-circuit fluid connection makes it easy to compensate for the problem of incoming and outgoing flows of different magnitudes, especially in the case of a differential piston. The second chamber normally has a smaller volume than the first chamber. When the short-circuit fluid connection is established, the flow of fluid flows out of the second chamber via the short-circuit fluid connection into the first chamber and assists the movement of the control element into the safety position. This process preferably takes place completely decoupled from the working circuit. Moreover, measures, for example, in the form of a check valve, can be provided to prevent fluid from the tank from flowing into the second chamber.

For this purpose, a short-circuit valve can advantageously be provided in the short-circuit fluid connection that is configured and actuated in such a way that, in the failure state, it is forced open, preferably mechanically or electrically, by means of the on-off valve (8). The tank is then automatically connected to the first chamber, together with the establishment of the short-circuit fluid connection, by means of the short-circuit valve due to the forced actuation.

For this purpose, the on-off valve and the short-circuit valve can also advantageously be combined into one structural unit so that the short-circuit valve becomes an integral part of the on-off valve. The possibility also exists for a circuit variant in which the on-off valve automatically assumes this function as well, without there being a need for a structural change to the on-off valve.

This alternative invention can also be practically combined with the features of subordinate claims 2, 5 to 13 (including their combinations), which are new vis-à-vis claim 1. Moreover, the alternative invention also refers to a method for actuating a control element by means of a fail-safe actuation system (1), whereby, in the operative state, the control element (2) is actuated by means of the working circuit (5) that pumps into the first or the second chamber (3, 4), and, in the failure state, the control element (2) is moved into the safety position, comprising the following steps:

connecting the tank (7) to the first chamber (3) of the control element (2), whereby an inflow into the first chamber (3)—in a manner that is completely decoupled from the working circuit (5)—is established, and short-circuiting the flow of fluid from the second chamber (4) of the control element (2) to the first chamber (3) by means of a short-circuit valve.

Moreover, the alternative invention can also relate to the use of this alternative fail-safe actuation system in a wind power plant in order to set the angle of attack of at least one rotor blade.

Furthermore, the envisaged objective is achieved by a method for actuating a control element having three chambers by means of an above-mentioned fail-safe actuation system, whereby, in the operative state, the control element is actuated by means of the working circuit that pumps into the second or third chamber (4, 15), and, in the failure state, the control element is moved into the safety position, comprising the following steps:

connecting the tank to the first chamber of the control element, whereby an inflow into the first chamber—in a manner that is completely decoupled from the working circuit—is established; and draining fluid from the second chamber of the control element by means of the drain valve that is moved into the through-flow position for this purpose. This method allows the actuation system to be moved into the safety position by means of the above-mentioned steps.

Moreover, it is provided according to the invention to use a fail-safe actuation system as described above in a wind power plant in order to set the angle of attack of at least one rotor blade.

Below, the embodiments will be described in greater detail with reference to the drawings.

Figure 2:
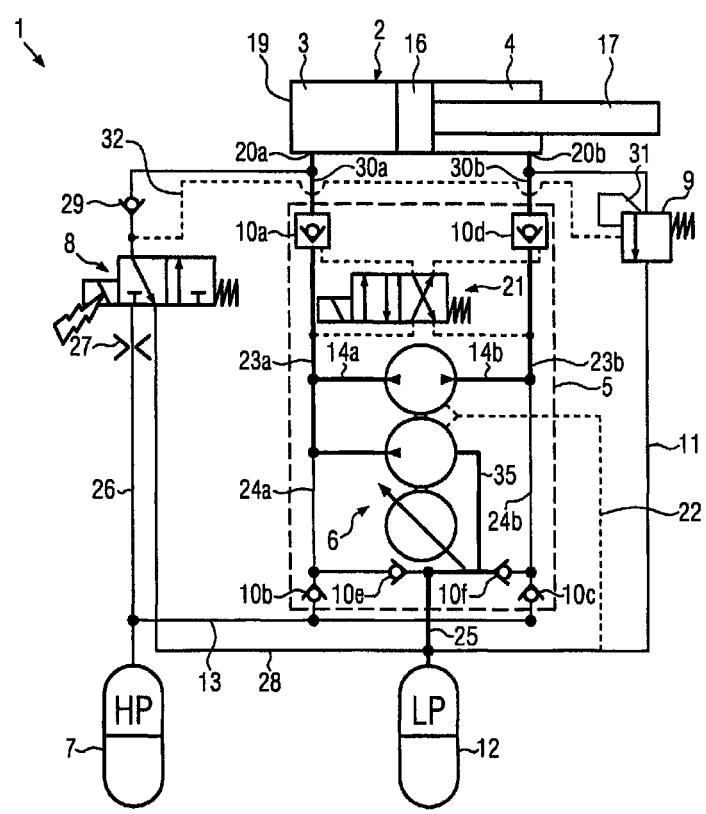
Figure 3:
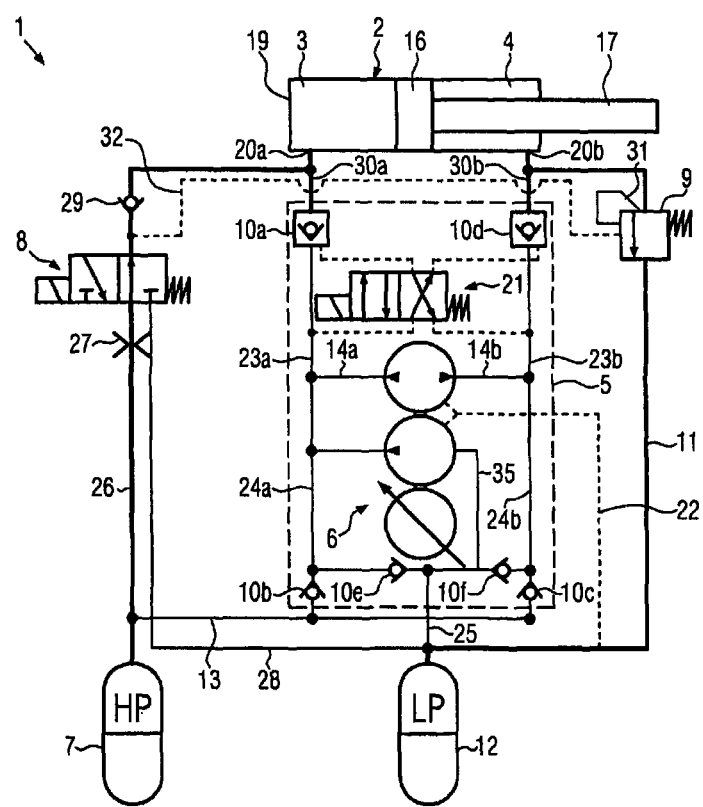
Figure 4:
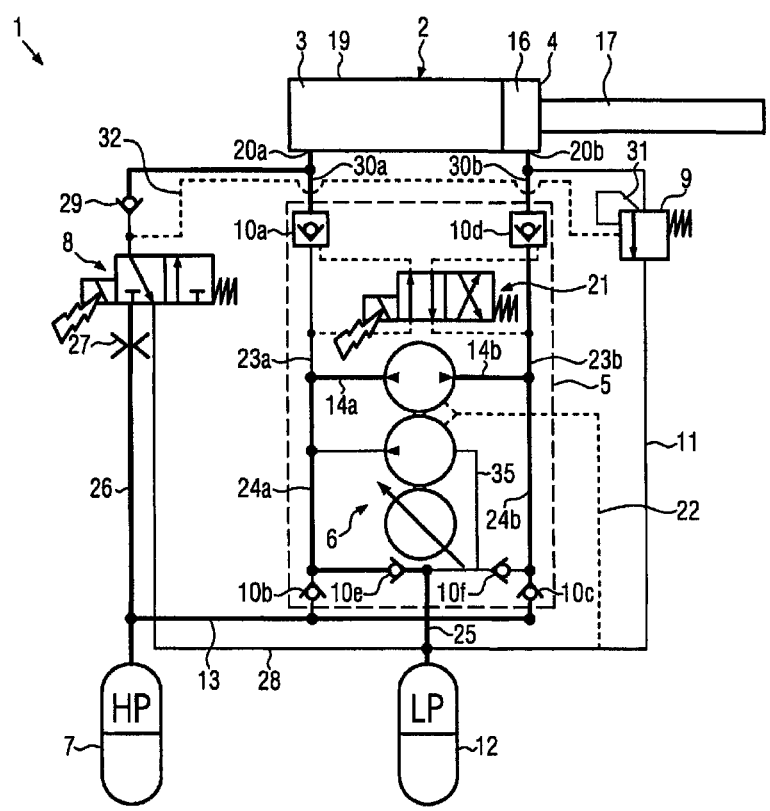
Figure 5:
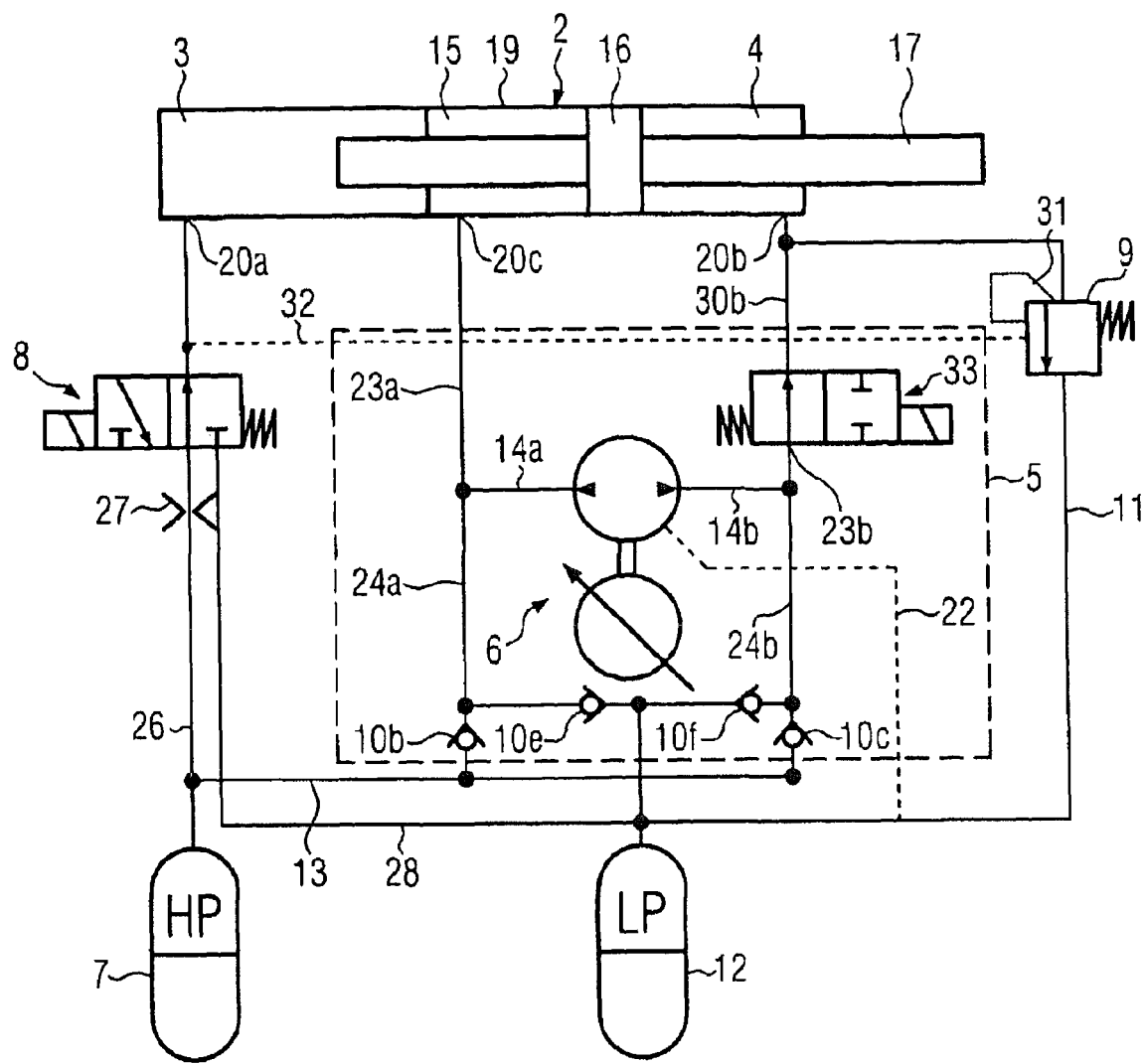
Figure 6:
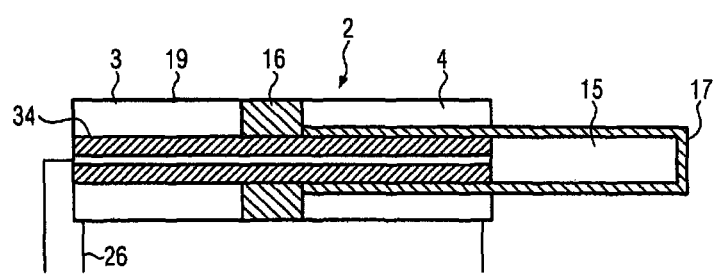
Figure 7:
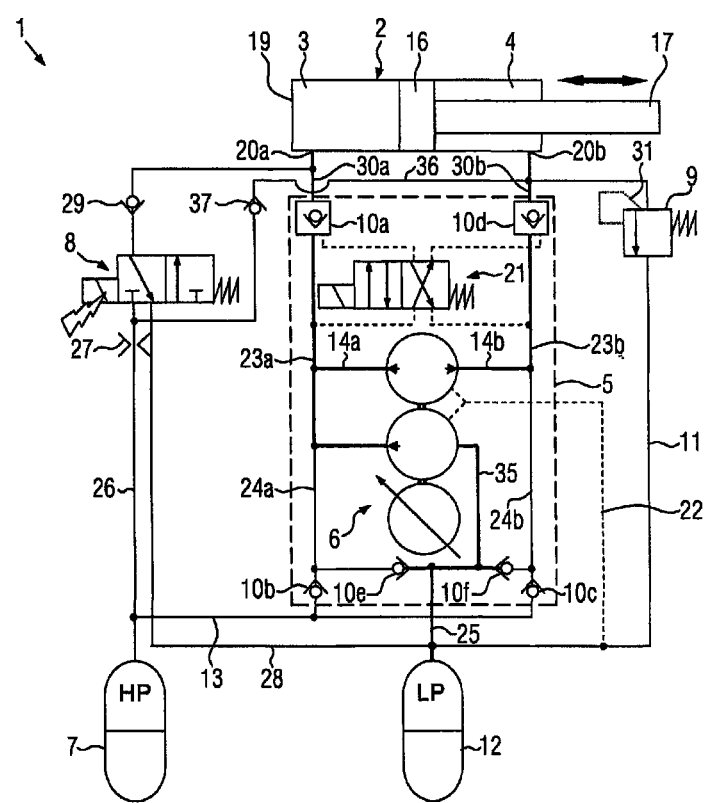
Figure 8:
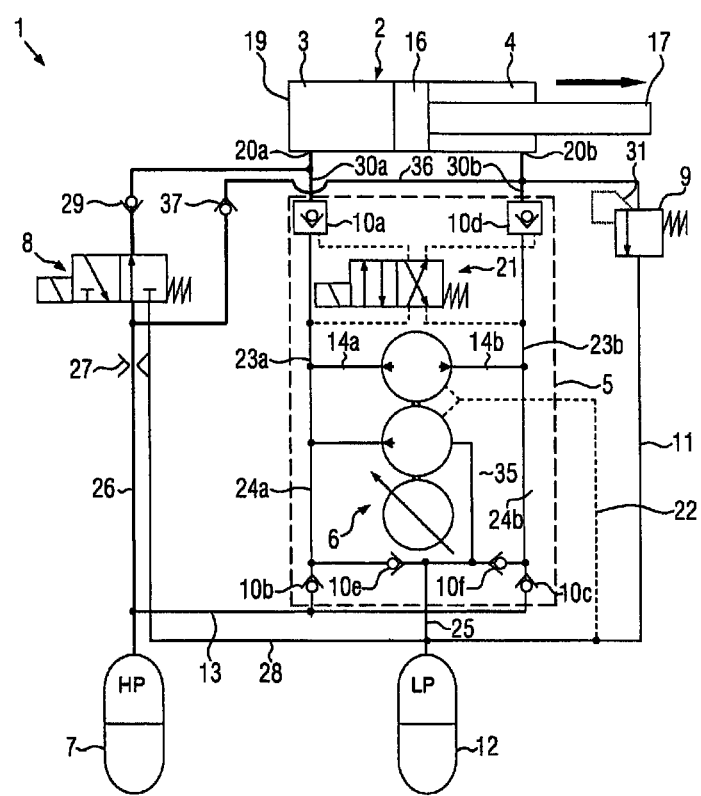
Figure 9:
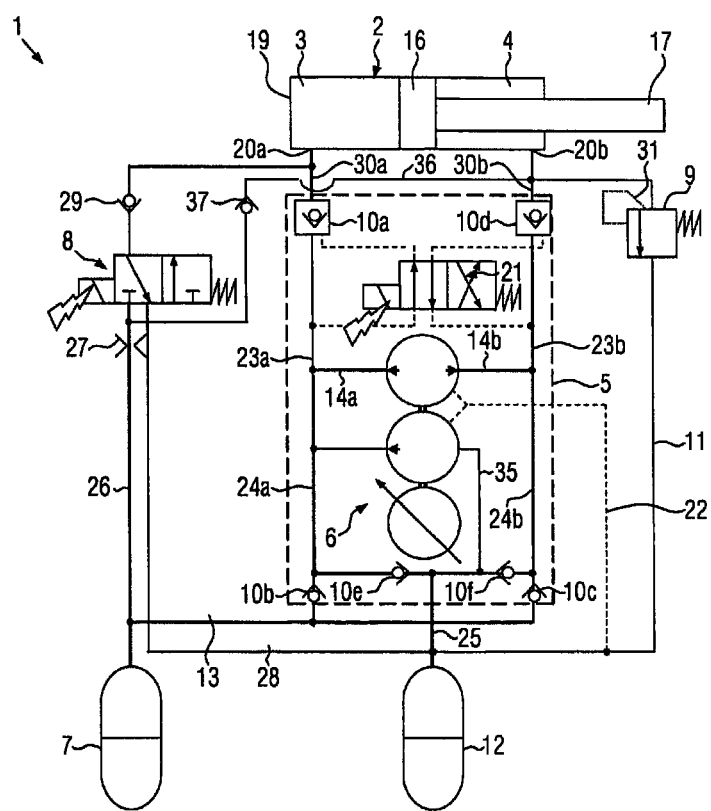

The following is shown:

FIG. 1 a schematic depiction of the circuit arrangement of an actuation system,

FIG. 2 another actuation system in the operative state,

FIG. 3 a depiction of the actuation system from FIG. 2 in the failure state,

FIG. 4 a depiction of the actuation system from FIG. 2 while the tank is being filled, FIG. 5 an embodiment of an actuation system according to the invention, FIG. 6 a control element by way of example, for use in the actuation system according to FIG. 5, FIG. 7 another actuation system in the operative state, FIG. 8 a depiction of the actuation system from FIG. 7 in the failure state, and FIG. 9 a depiction of the actuation system from FIG. 7 while the tank is being filled.

FIG. 1 shows a circuit diagram for the actuation system 1. The actuation system 1 comprises a working circuit 5 as well as a safety circuit and a control element 2. The control element 2 comprises a first chamber 3 and a second chamber 4. The first and second chambers 3, 4 are divided by means of a plunger 16. A piston 17 is connected to the plunger 16, and this piston 17 extends through the second chamber 4 and protrudes out of it, all the way through the housing 19. In the embodiment shown, another piston section 18 is attached to another side of the plunger 16, and this piston section 18 extends through the first chamber 3 and protrudes out of it, all the way through the housing 19. Fluid, for example, hydraulic fluid, can be fed into the chambers 3, 4, which brings about an increase in the volume of the one chamber and a corresponding decrease in the volume of the other chamber. The chambers 3, 4 are essentially hermetically sealed, so that—together with the housing 19—the plunger 16, the piston 17 and the piston section 18 form an essentially fluid-tight system. Accordingly, the plunger 16 seals the first chamber 3 vis-à-vis the second chamber 4. The piston 17, which extends through a wall area of the housing 19, seals the second chamber 4 vis-à-vis the environment. The piston section 18 that extends through a wall area of the housing 19, seals the first chamber 3 vis-à-vis the environment.

The plunger 16 with the piston 17 and the piston section 18 can be moved between two end positions. In the first end position, the first chamber 3 is filled with the maximum volume of fluid, whereas the second chamber 4 is completely empty. The piston 17 is completely extended in this end position. Below, this end position will also be referred to as the safety position. The second end position is reached in that the second chamber 4 is filled with its maximum volume of fluid, whereas the first chamber 4 is essentially completely empty. In this case, the piston 17 is retracted, that is to say, only a short section of the piston 17 extends out of the housing 19.

The control element 2 has two connections 20a, 20b by means of which fluid can be fed into and discharged from the chambers 3 and 4, respectively. The working circuit 5 of the embodiment shown is thus connected to the first chamber 3 and to the second chamber 4.

The working circuit 5 of the embodiment shown comprises a motor/pump device 6, a control valve 21, first and second connecting lines 14a, 14b and valve elements 10a, 10b, 10c, 10d, 10e, 10f. Moreover, the working circuit 5 comprises additional fluid lines such as first control element lines 23a, 23b, and first and second fluid lines 24a, 24b, which join the individual elements to each other. To put it in other words, the working circuit comprises all of the elements that are used to move the control element during normal operation.

In the embodiment of FIG. 1, the working circuit is delimited with respect to the safety circuit and with respect to the remaining elements of the actuation system by means of the valve elements 10a, 10b, 10c, 10d, 10e, 10f.

The motor/pump device 6 has a motor, preferably an electric motor, and a pump. The motor powers the pump, thereby ensuring the supply of fluid for the actuation system. The motor is preferably speed-variable and can preferably be driven in two directions of rotation.

The pump has first and second connecting lines 14a, 14b. In a first direction of rotation of the motor, the connecting line 14a serves as a suction line or feed line, while the second connecting line 14b serves as a drain line. In the other direction of rotation, the second connecting line 14b serves as a feed line while the first connecting line 14a serves as a drain line. A leak line 22 through which leakage fluid can be drained is connected to the pump. In the embodiment shown, the first connecting line 14 branches into a first control element line 23a and a first fluid line 24a. Via the first control element line 23a, fluid can be conveyed in the direction of the first chamber 3 of the control element 2, or it can be conveyed back to the pump from the first chamber 3. Correspondingly, the second connecting line 14b likewise branches into a second control element line 23b and into a second fluid line 24b. Via the second control element line 23b, fluid can be conveyed in the direction of the second chamber 4 of the control element 2, or it can be conveyed back to the pump from the second chamber 4. In each case, a valve element 10a, 10d is positioned adjacent to the first and the second control element lines 23a, 23b. The valve elements 10a, 10d are configured in such a way that a flow is possible from the pump through the control element lines 23a, 23b and through the valve elements 10a, 10d, but a backflow from the chambers 3, 4 of the control element 2 is only possible through the valve elements 10a, 10d when the through-flow position has been selected. A flow through the valve elements 10a, 10d in the direction of the control element is thus possible, whereas a backflow through the valve elements 10a, 10d into the control element lines 23a, 23b is only possible during certain prescribed operative states. Consequently, the valve elements 10a, 10d are preferably configured as switchable check valves.

The valve elements 10a, 10d constitute the closure of the working circuit 5 with respect to the lines that serve to supply the control element 2.

A control valve 21 is provided in order to permit a backflow from the chambers 3, 4 of the control element 2 into the control element lines 23a, 23b. The control valve 21 makes it possible to open one of the valve elements 10a, 10d in such a way that a backflow into the appertaining control element line is made possible. Correspondingly, for example, in case of a valve element 10a that has been opened for the backflow, the backflow into the valve element 10d is blocked, and vice versa. This can be achieved, for instance, in that the control valve 21 is configured as a four-way valve or a two-way valve. For this purpose, a signal connection to the control valve 21 is established in the first and second control element lines 23a, 23b. This means that a pressure signal is emitted to the control valve 21 in case of pressure in the first control element line 23a. Correspondingly, a pressure signal is emitted to the control valve 21 in case of pressure in the second control element line 23b. In a first switching position, the control valve 21 has a crossed-over circuit and in a second switching position, it has a parallel circuit. If no current is present at the control valve 21, the crossed-over circuit is set by means of a spring. If current is applied to the control valve 21, the parallel circuit is present. The individual switching states can also be set in any other suitable way, although the crossed-over circuit should be present in the de-energized state or in the failure state. A signal line leads from the control valve 21 to the valve element 10a and to the valve element 10d.

Accordingly, such an interconnection arises that, in case of pressure in the first control element line 23a, the valve element 10d in the second control element line 23b is released by means of the crossed-over circuit. In case of pressure in the second control element line 23b, the crossed-over circuit in the control valve 21 transmits a pressure signal to the valve element 10a and releases it in order to permit a backflow into the first control element line 23a.

Thus, if the pump is rotating in one direction of rotation or if it is pumping in a direction that brings about a pressure build-up in the first control element line 23a, then fluid is conveyed through the valve element 10a into the first chamber 3. Due to the pressure build-up in the first control element line 23a, the valve element 10d in the second control element line 23b is released by means of the control valve 21. A backflow of fluid from the second chamber 4 of the control element 2 into the second control element line 23b is made possible when the valve element 10d is opened.

This embodiment makes it possible to fill one chamber and to empty the other chamber essentially at the same time. The corresponding technical function is achieved when the pump runs in the other direction of rotation. In this case, pressure is built up in the second control element line 23b and fluid is conveyed to the second chamber 4. Due to the built-up pressure in the second control element 23b, the valve element 10a in the first control element line 23a is opened by means of the control valve 21 and a backflow from the first chamber 3 is made possible.

Here, it is the case that fluid that is drained from the control element is conveyed directly to the pump via one of the control element lines 23a, 23b via the first and second connecting lines 14a, 14b, and is conveyed by the pump in the direction of the chamber that is to be filled. Therefore, fluid that is drained from the control element 2 is once again pumped directly into the control element 2 without first reaching the reservoir.

The actuation system 1 also comprises a reservoir 12 as well as a tank 7. The reservoir 12 serves to hold fluid that can be removed by the safety circuit 5 from the reservoir via a reservoir line 25 that is connected to the working circuit 5. The reservoir and the reservoir line 25 connected to it can be configured or connected to each other in such a way that fluid can be removed from the reservoir in any possible operating position. It is conceivable that the fluid can be stored in the reservoir 12 at a prescribed pressure. The reservoir line 25 is connected to the working circuit 5 in such a way that fluid can be received in the working circuit, but no fluid can be discharged from the working circuit into the reservoir line or into the reservoir. In the embodiment shown, the valve elements 10e and 10f are provided for this purpose. The valve elements 10e and 10f are configured in such a way that they permit a flow of fluid into the working circuit 5 but prevent a flow out of the working circuit 5 into the reservoir 12. Therefore, these valve elements 10e and 10f are preferably configured as check valves.

The tank 7 is configured as a pressure tank. It holds fluid under pressure. For this purpose, a filling line 13 is provided that connects the working circuit 5 to the tank 7. The filling line 13 is connected to the working circuit 5 in such a way that fluid under pressure can be conveyed out of the working circuit 5 into the tank 7. However, a flow of fluid from the tank 7 into the working circuit 5 is prevented by means of at least one valve element. In the embodiment shown, a backflow of hydraulic fluid into the working circuit 5 is prevented by means of two valve elements 1b, 10c. In other words, the tank is decoupled from the working circuit 5 in such a way as to prevent a flow out of the tank into the working circuit 5. In the embodiment shown, this decoupling is achieved by means of the valve elements 10b and 10c, although the use of just a single valve element would also be conceivable.

The control element 2 is decoupled from the working circuit 5 by means of the valve elements 10a, 10d. The decoupling is carried out in such a way that a backflow into the working circuit is not possible when the valve elements 10a, 10d are blocked.

A tank line 26 runs from the tank 7 in the direction of the first chamber 3 of the control element 2. In the embodiment shown, a throttle 27 is installed in the tank line 26. Moreover, an on-off valve 8 is installed in the tank line 26. In the embodiment shown, the on-off valve 8 is configured as a three-way or two-way valve. This results in two connections of the tank line 26, which is interrupted by the on-off valve 8. The third connecting line is a second reservoir line 28 that runs from the on-off valve 8 to the reservoir 12. The switching states of the on-off valve 8 are selected in such a way that the tank line 26 is not interrupted in the position referred to as the through-flow position, and a flow of fluid from the tank 7 in the direction of the first chamber 3 of the control element 2 is made possible. The on-off valve 8 is configured in such a way that this through-flow position is reached by means of a spring, and consequently, it is reached even in case of a failure of the control unit or in case of a power failure. Another switching position, called the blocking position, blocks the inflow from the tank 7 and connects the second reservoir line 28 to the section of the tank line 26 that runs from the on-off valve 8 in the direction of the first chamber 3. In the embodiment shown, this switching position is reached by means of a magnetic actuator. Moreover, the tank line 26 comprises a blocking element 29 that permits a flow of fluid in the direction of the control element 2, but that prevents a flow from the direction of the control element 2 in the direction of the tank 7. The tank line 26 opens up into a first line section 30a. The first line section 30a connects the first chamber 3 to the tank line 26 as well as to the valve element 10a to which the first control element line 23a is connected.

The actuation system 1 also comprises a drain line 11 that is connected to a line section 30b. The second line section 30b connects the second chamber 4 to the valve element 10d to which the second control element 23b as well as the drain line 11 are connected. A drain valve 9 is arranged in the drain line 11. The drain valve 9 is configured in such a way that it is held by means of spring force in a closed position, that is to say, the drain valve 9 is in a blocking position when it is in its basic position.

The drain valve 9 has a positive pressure circuit 31. If the pressure in the second chamber 4a rises to an impermissible level, then the positive pressure circuit 31 causes the drain valve 9 to open, as a result of which fluid is drained and the pressure is decreased. Normally, this pressure is about 250 bar. Therefore, the drain valve 9 serves as a pressure limiting valve. There is a signal connection 32 between the tank line 26 and the drain valve 9. The signal connection 32 is preferably configured as a fluid line having a small diameter. The fluid line is used only for pressure transmission, whereby little or no flow of fluid occurs. In the embodiment shown, the signal connection 32 is connected to the tank line 26 downstream from the on-off valve 8 upstream from the blocking element 29. As an alternative, the signal connection 32 can also be connected in another manner, whereby it must be ensured that the signal connection 32 is only pressurized when the on-off valve 8 is also moved into the through-flow position, that is to say, when the tank 7 has been connected to the first chamber 3. The drain valve 9 can be moved into the open position, that is to say, the through-flow position, by means of the signal connection 32. When the tank 7 is connected to the control element, then a pressure signal is transmitted to the drain valve 9 by means of the signal connection 32, which causes the drain valve 9 to open. The signal connection 32 can also be established in another suitable manner and does not necessarily have to be connected as a fluid communication.

The drain line 11 opens into the reservoir 12 downstream from the drain valve 9. In the embodiment shown, the leakage line opens up into the drain line 11. Leakage fluid from the pump can thus drain via the leakage line 22 in the direction of the reservoir. As an alternative, the leakage line 22 can also be connected directly to the reservoir. Even if the drain line 11 and the leakage line 22 are connected, this is not to be understood as an elimination of the decoupling between the drain line 11 and the working circuit 5. Normally, little or no fluid flows through the leakage line 22 and therefore, this is not relevant for the actual function of the working circuit 5 and of the drain line 11. Preferably, the leakage line 22 opens up directly into the reservoir 12.

In the embodiment shown, the reservoir line 25, the second reservoir line 28 and the drain line 11 are connected to each other before they open up jointly into the reservoir 12. However, this configuration is not absolutely necessary since any other suitable fluid connection between these lines and the reservoir 12 is sufficient for their function.

Making reference to the other figures, additional embodiments of the actuation system will be explained in greater detail below. Only the essential differences from the preceding embodiment will be elaborated upon below. Consequently, the same reference numerals will be used for identical and functionally equivalent elements and reference will be made accordingly to the preceding description. Unless otherwise indicated, the following embodiments and explanations also apply to the embodiment of FIG. 1.

In the embodiment shown in FIG. 2, a control element 2 is used that has only one piston 17 that extends out of the housing 19 on only one side. Moreover, the actuation system of this embodiment uses a motor/pump device 6 with one motor and two pumps. One pump is configured as a unidirectional pump, that is to say, as a pump that conveys fluid only in one direction of rotation. The second pump is configured as a pump with a variable direction of rotation, that is to say, this pump conveys fluid in a first direction of rotation as well as in a second direction of rotation, whereby the suction side and the delivery side of this pump likewise change when the direction of rotation changes. The motor/pump device is configured in such a way that, in a first direction of rotation, both pumps convey fluid via the first control element line 23a in the direction of the first chamber 3 of the control element 2. In the second direction of rotation, only one of the two pumps conveys fluid via the second control element line 23b in the direction of the second chamber 4. The arrangement is selected here in such a way that the piston 17 of the control element 2 extends through the second chamber 4, and the volume of the second chamber 4 is correspondingly reduced by the volume of the piston 17 passing through it. Accordingly, this also reduces the active surface area of the plunger 16 on which the fluid in the chamber 4 acts, since the fastening surface of the piston 17 reduces the free surface area of the plunger 16. Correspondingly, the volume of the first chamber 3 is greater in comparison to that of the second chamber 4. By the same token, a larger active surface area of the plunger 16 in the first chamber 3 is available for the fluid. Therefore, the control element can be referred to as a differential piston.

Consequently, the pumps are arranged in such a way that, in the first direction of rotation, in which both pumps are conveying fluid, the fluid is conveyed into the first chamber 3, whereas in the second direction of rotation, in which only one pump is conveying fluid, this fluid is conveyed into the second chamber 4.

In the embodiment of FIG. 2, the working circuit 5 comprises a suction line 35 that is connected to the reservoir line 25. Consequently, the definition of the working circuit 5 of the embodiment of FIG. 2 also comprises the suction line 35 in addition to the elements of the working circuit according to FIG. 1.

Unless otherwise indicated, the mode of operation of the actuation system will be described below. The mode of operation here is identical for all of the embodiments.

FIG. 2 shows the function of the actuation system in the operative state. For this purpose, the fluid lines in which fluid normally flows or can flow during the operative state are marked, that is to say, drawn with a thicker line. However, this depiction does not permit the conclusion that there is no flow in the unmarked fluid lines. The marking serves merely for a better depiction and does not entail any conclusions about the necessity or function of the lines.

The term operative state is used to refer to the normal operation of the actuation system, during which the piston of the control element 2 can be extended and retracted by means of the motor/pump device.

In the operative state, the drain valve 9 is closed, so that no fluid can drain from the second chamber 4 via the drain line 11 into the reservoir 12. The tank line 26 is closed by means of the on-off valve 8, that is to say, the tank line 26 is interrupted, so that no fluid can flow from the tank in the direction of the first chamber 3. For this purpose, the on-off valve 8 is energized so that it is in the blocking position vis-à-vis the tank line 26. In the operative state, the motor drives the pump (FIG. 1) or the pumps (FIG. 2), whereby, as already described above, depending on the direction of rotation, fluid is conveyed either in the direction of the first chamber 3 or of the second chamber 4. If fluid is being pumped into the first control element line 23a, it flows through the valve element 10a, the first line section 30a and the connection 20a into the first chamber 3. At the same time, the control valve 21 that is in the crossed-over circuit releases the valve element 10d, as a result of which a backflow of fluid from the chamber 4 into the second control element line 23b to the motor/pump device is made possible. Accordingly, when the first chamber 3 is filled, the second chamber 4 is emptied and the piston 17 is extended with a corresponding change in the position of the plunger 16. Due to the fact that the fluid drained from one chamber is once again fed to the pump and pumped into the other chamber, there is normally no loss of fluid. However, if a fluid deficit should nevertheless occur, then additional fluid can be drawn in via the reservoir line 25 and the valve elements 10e and 10f, or via the suction line 354 (FIG. 2). In the operative state, the actuation of the control element 2 is performed only by means of the working circuit 5.

FIG. 3 shows the actuation system in a failure state. The term failure state is used here to refer to a failure of the motor pump unit, a power failure or a leakage in the working circuit. Generally speaking, a failure state can refer to a state of the actuation system in which the working circuit is not able to move the control element into the safety position.

The control element has to be moved into the safety position when the working circuit is no longer able to control or regulate the control element in a controlled manner, or when external circumstances require this. An external circumstance that requires the control element to be moved into the safety position could occur, for instance, when the actuation system is being used as a setting unit for a rotor blade of a wind power plant. If wind speeds occur that exceed the prescribed load limits of the plant, then the rotor blades have to be moved into a safe position. In this safe position, the rotor blades offer the wind a smaller angle of attack, as a result of which the loads on the entire plant are reduced. In the embodiments shown, the safety position is the position of the control element in which the piston 17 is completely extended. Depending on the application purpose of the actuation system, however, any another position of the piston 17 can be defined as the safety position.

In the failure state, the on-off valve 8 switches in such a way that the tank 7 is connected by means of the tank line 26 to the first chamber 3. In order to achieve this, the on-off valve 8 is pre-tensioned by means of a spring so that, for example, in case of a power failure, the on-off valve 8 is pushed into the correct position. Here, it should be pointed out that electric sensors or other sensors can also be provided that recognize a failure state and generate an appropriate signal that causes the safety position to be assumed. For this purpose, the on-off valve 8, which is held in the blocking position during the operative state, for example, by means of an electromagnet, is disconnected from the power circuit so that the spring can cause the through-flow position to be assumed.

If the on-off valve 8 has been moved into the through-flow position, pressurized fluid flows into the first chamber 3. By means of the signal connection 32, the drain valve 9 is moved into the through-flow position so that fluid can flow out of the second chamber 4 via the drain line 11 into the reservoir 12. The valve elements 10a, 10d are closed here and prevent a flow of fluid from the second chamber 4 through the valve element 10d into the working circuit as well as a flow of pressurized fluid from the tank 7 into the working circuit 5 via the valve element 10a.

The pressurized fluid from the tank 7 flows into the first chamber 3 and displaces the plunger 16 and thus also the fluid in the second chamber 4. This leads to an extending movement of the piston 17, as a result of which it moves into the safety position. The extending movement of the piston 17 is controlled by means of the throttle 27 in the tank line 26. Depending on the choice of the throttle, the flow rate into the first chamber 3 can be selected. Moreover, the possibility fundamentally exists to dispense with the throttle 27.

If the working circuit 5 has not failed entirely, the working circuit 5 can also assist in reaching the safety position. Here, the motor/pump device conveys fluid in the direction of the first chamber 3. The valve element 10a is configured in such a way that fluid is conveyed in the direction of the first chamber 3, but a flow into the working circuit 5 through the valve element 10a is not possible.

However, if the working circuit 5 has failed entirely and is not available to move the control element 2 into the safety position, then, as can be seen in FIG. 3, the safety circuit constitutes a redundant actuation possibility for the control element 2. The fluid supply as well as the fluid drainage are configured to be completely redundant and they function independently of the working circuit 5. Consequently, the safety circuit can be viewed as a bypass to the working circuit 5. The structure of the working circuit is fundamentally not relevant for the function of the fail-safe actuation system, as long as the above-mentioned decoupling has been established. Therefore, the working circuit can also be viewed as a module that can be replaced independently of the safety circuit or that can be adapted to the circumstances on hand.

The valve elements 10a, 10b, 10c, 10d, 10e, 10f ensure that no fluid or pressure in the working circuit 5 is lost from the tank 7, but rather that these are completely available for the actuation of the control element 2.

FIG. 4 shows the filling of the tank 7. The control element 2 is in the safety position, that is to say, the piston 17 is completely extended. However, the piston can also be fixed in any desired position during the filling of the tank 7. The control valve 21 is in a parallel circuit. The on-off valve 8 is switched in such a way that the tank line 26 to the first chamber 3 is interrupted. The motor/pump device pumps into the second control element line 23b, whereby the pressure or the flow of fluid into the second fluid line 24b continues. The fluid present in the second control element line 23b enters the second chamber 4 via the valve element 10d. Since the control valve 21 is in a parallel circuit, the valve element 10a has the function of a check valve. Due to the blocked control element 10a, the fluid present in the first chamber 3 cannot drain out, which is why a counter-pressure to the fluid pressure in the chamber 4 builds up in the first chamber 3, and movement of the piston 17 is prevented. The fluid pressure built up by means of the motor/pump device continues via the second fluid line 24b and leads to a flow of fluid through the valve element 10c and the filling line 13 to the tank 7. The fluid needed for this purpose is drawn in from the reservoir 12 via the fluid line 25 through the valve element 10e into the first fluid line 24a and into the first connecting line 14a leading to the motor/pump device. This is done until the necessary or prescribed filling pressure in the tank has been reached. This filling pressure is approximately in the range from 150 bar to 250 bar. For this purpose, a pressure sensor can be provided in the tank 7, in the filling line 13 or in the tank line 26.

If the tank has been filled, the on-off valve 8 remains in the blocking position in order to prevent an emptying of the tank 7 into the first chamber 3. The valve elements 10b and 10c prevent a pressure loss into the working circuit via the filling line 13. The control valve 21 is moved into the crossed-over circuit again.

FIG. 5 shows an embodiment of the actuation system according to the invention. The actuation system of this embodiment has a control element with three chambers. In addition to the first and second chambers 3, 4, this valve element has a third chamber 15. The actuation system is configured in such a way that the tank line 26 opens up into the first chamber 3. The first control element line 23a opens up into the third chamber 15 and the second control element line 23b opens up into the second chamber 4. The first chamber 3 is thus associated with the safety circuit, and the second and third chambers 4, 15 are associated with the working circuit; in other words, the working circuit is in contact with the second and third chambers 4, 15. Preferably, the piston surfaces on which the fluid acts in the chambers of the working circuit, that is to say, the second and third chambers 4, 15, have surface areas of the same size.

Since a separate chamber is provided in the control element for the safety circuit, a redundancy is even achieved in terms of the chambers of the control element needed for the actuation. Regarding the inflow to the control element, the working circuit and the safety circuit are completely decoupled since the feed lines have no connection with each other. Consequently, a failure of the working circuit that impairs the functionality of the associated chambers 4, 15 has no effect on the safety circuit due to the complete separation of the first chamber 3.

A filling valve 33 adjoins the second control element line 23b. In the operative state, the filling valve 33 has been moved into the through-flow position. Depending on the direction of rotation of the pump, fluid can be conveyed into the second chamber 4 or into the third chamber 15, whereby fluid is drained from the other chamber in each case.

Diverging from the embodiments described above, the working circuit 5 of the embodiment in FIG. 5 is limited by means of the filling valve 33 and the connection 20c, whereby the filling valve 33 is viewed as an element of the working circuit 5.

When the tank is to be filled, the piston 17 is blocked, that is to say, fixed in its position. The filling valve 33 is moved into the blocking position. The pump conveys fluid in the direction of the second control element line 23b, whereby the through-flow, however, is blocked by the blocked filling valve 33. The fluid also flows into the second fluid line 24b through the valve element 10c into the filling line 13. During the filling procedure, the on-off valve 8 is in the blocking position, that is to say, the tank line 26 is interrupted in the direction of the first chamber 3. As a result, fluid flows into the tank 7. After the tank has been filled, the valve elements 10b and 10d prevent a backflow of fluid from the tank into the working circuit 5. The switching valve 8 continues to be kept closed. The filling valve 33 is moved into the through-flow position, after which the working circuit 5 can control or regulate the piston 17.

During the filling procedure, fluid is drawn from the reservoir 12 via the reservoir line 25 through the valve element 10e into the first fluid line 24a and the first connecting line 14a to the motor/pump device 6.

In the operating state, the piston 17 and the plunger 16 can be moved inside the housing 19 of the control element 2. In this process, the volume of the first chamber 3 also changes. For this purpose, the first chamber 3 is connected via the switching valve 8 to the second reservoir line 28 through which fluid can be drawn from the reservoir when the volume of the first chamber 3 is increased and fluid is being discharged into the reservoir when the volume of the first chamber 3 decreases. This configuration prevents a positive pressure or a negative pressure from building up in the chamber 3, which would impair the function of the control element 2.

In the failure state, the switching valve 8 is moved into the through-flow position so that the tank 7 is connected to the first chamber 3 via the tank line 26. An opening signal is transmitted via the signal connection 32 to the drain valve 9, which opens. The fluid flowing out of the tank 7 into the first chamber 3 displaces the plunger 16 and causes the piston 17 to move into the safety position. Correspondingly, fluid has to be fed into the third chamber 15 in order to avoid a negative pressure. This required fluid can be conveyed from the reservoir 12 via the reservoir line 25 through the valve element 10e, the first fluid line 24a as well as the first control element line 23a. As an alternative, the fluid for the third chamber 15 can also be fed via the inactive motor/pump device in that fluid flows through the inactive pump when, in the second control element line 23b, as shown in FIG. 5, a valve element has been dispensed with that would prevent the backflow from the second chamber 4.

FIG. 6 shows a control element with three chambers of the type that could be used for the embodiment in FIG. 5. Here, the piston 17 is configured so as to be hollow in order to accommodate a third chamber 15. In order to permit an inflow to the third chamber 15 in a manner that is separated from the first chamber 3, a sleeve 34 is inserted into the housing 19 of the control element 2. The chamber 15 is supplied with fluid through the sleeve 34. The hollow piston 17 slides on the sleeve and closes it off hermetically.

Another variant of an actuation system 1 is described with reference to FIGS. 7 to 9. The basic construction of this actuation system 1 is essentially identical to that of the actuation system 1 that was described with reference to FIGS. 2 to 4. Below, only the essential remaining differences will be elaborated upon and consequently, the same reference numerals will be used to refer to the otherwise applicable description of what is shown in FIGS. 2 to 4.

An essential difference lies in the drainage of the hydraulic fluid from the second chamber 4. In the actuation system 1 shown in FIGS. 7 to 9, the drain valve 9 serves exclusively as a pressure relief valve and thus safeguards the system. A signal connection 32, as shown in the actuation system of FIGS. 2 to 4, is thus not present. Instead, downstream from the connection 20b, a short-circuit fluid connection 36 branches off and opens up into the tank line 26. In the embodiment, the short-circuit fluid connection 36 opens up into the tank line 26 between the throttle 27 and the on-off valve 8. In order to prevent conveying from the tank 7 into the chamber 4, a check valve 37 is arranged in the short-circuit fluid connection 36. The short-circuit fluid connection 36 branches off between the connection 20b and the valve element 10d, so that there is still a separation between the tank 7 and the working circuit 5.

Due to this embodiment of the short-circuit fluid connection 36, the on-off valve 8 concurrently serves as a short-circuit valve, since the on-off valve 8 short-circuits the second chamber 4 with the first chamber 3 exclusively in the safety position that is shown in FIG. 8, so that the volume of hydraulic fluid displaced from the chamber 4 flows through the short-circuit fluid connection 36, the on-off valve 8 and the control element 29 to the connection 20a and then into the first chamber 3. Therefore, this volume flow assists the volume flow coming from the tank 7 so that, with a smaller amount of hydraulic fluid from the tank 7, the first chamber 3 can be completely filled. Such a configuration is especially well-suited for the differential piston shown (control element 2).

FIG. 7 shows the normal operation in which, via the connections drawn with thick lines and via the working circuit 5, either the first chamber 3 or the second chamber 5 [sic] is filled. For this purpose, the solenoid of the on-off valve 8 is activated and the tank 7 is separated from the first chamber 3, and the short-circuit fluid connection 36 is blocked.

FIG. 9 shows the situation in which the position of the control element 2 is hydraulically blocked and the motor/pump device 6 fills the tank 7. For this purpose, the solenoid of the on-off valve 8 as well as the solenoid of the control valve 21 are activated. Here, the tank 7 remains separated from the first chamber 3 and the short-circuit fluid connection 36 is blocked. Moreover, the valve elements 10a and 10d also remain blocked so that no hydraulic fluid can flow out of the chamber 3 and the chamber 4, as a result of which the position of the control element 2 is fixed.

The already mentioned safety position that is shown in FIG. 8 is assumed, for example, in case of a power failure, so that the tank 7 is connected to the first chamber 3 of the control element 2. The short-circuit fluid connection 36 is connected through and the second chamber 4 is in fluid communication with the first chamber 3. After the motor/pump device 6 has also failed, for example, in case of a power failure, there is likewise no control pressure at the valve elements 10a and 10d, so that they block and the working circuit 5 is decoupled.

With this actuation system 1 as well, the use of appropriate valve elements 10a to 10d at all of the main outputs where there might be conveying flows generated by the motor/pump device 6 results in a modular structure, so that, in the safety position, the safety circuit can pump from the tank 7 into the first chamber 3, whereby the working circuit 5 is hydraulically completely decoupled. The only flow connection from the working circuit 5 into the safety position is via the filling line 13, through which the tank 7 can be filled using the motor/pump device 6.

The actuation system can be used in a method for actuating a control element. Here, during the normal operating state, the control element is actuated by means of the working circuit that pumps into the second or third chamber. As soon as a failure state occurs, the control element is moved into the safety position. This comprises the following steps: connecting the tank to the first chamber of the control element, thereby creating an inflow into the first chamber in a manner that is completely decoupled from the working circuit, and draining fluid in the second chamber of the control element via the drain valve, which can be moved into the through-flow position for this purpose.

Preferably, the described actuation system and its variants are used in one of the application cases described in the introduction. In other words, the embodiment of the actuation system according to the invention is suitable, for example, for wind power plants for setting the angle of attack of at least one rotor blade, for gas turbines, steam turbines or water turbines in order to set the specific blade angle or for applications in the oil and gas industries, where control elements are used which, in the failure state, have to be moved into a safety position.

Particularly with wind power plants, it is necessary to be able to change the angle of attack of individual rotor blades relative to the wind. In case of high winds, the maximum load-bearing limit of the rotor blades as well as of the entire structure can be reached. Therefore, in these cases, it is necessary to move the rotor blades into a safety position in which they offer the wind the smallest possible surface area of attack. Moreover, the possibility exists that the individual rotor blades are set in such a way that they each generate torques that offset each other, thereby keeping the wind power plant at a standstill. In this process, it must be ensured that these safety positions can be reached with absolute reliability. For this reason, it must be possible to assume the safety position fully automatically, even in case of a power failure.

Similar considerations also apply to the use of the actuation system in gas turbines for adjusting the gas mass flow or in steam turbines for adjusting the steam mass flow. In such systems as well, it can be necessary to reliably move a control element into a safety position. The actuation system according to the invention as well as the method for actuating a control element can thus be used for this purpose as well.

The proposed actuation system has the advantage that the safety position in the failure state is achieved only by means of the energy stored in the tank. Even if the pump is blocked or if the lines in the working circuit are damaged, the control element can be moved into the safe position. The described actuation system in all its configurations can be implemented in a very small installation space. Therefore, when used in wind power plants, the actuation system can be installed entirely in the rotor. Complicated and expensive hydraulic conduits from the rotating rotor into the machine housing are thus unnecessary. Only the required power supply has to be ensured, but this can be achieved in a simple manner.

Moreover, the actuation systems with valve elements 10a, 10d, which can prevent a backflow of fluid from the control element into the working circuit, offer the simple possibility to affix the control element in its specific position, without having to use energy for this purpose. As soon as the desired position of the piston 17 has been reached, the motor/pump device 6 can be switched off. Since the valve elements 10a, 10d can prevent the backflow from the chambers 3, 4, the piston position can be maintained without a need for energy. Such a function for securing the piston is also implemented in the embodiment of FIG. 5 when the filling valve 33 is moved into the blocked position. The securing of the control element lends itself particularly well when, due to small leaks, there is a need to refill the tank. The control valve 21 is switched in such a way that the valve elements 10a and 10d act as check valves. A backflow from the control element into the working circuit is thus prevented. The motor/pump device can then pump fluid into the tank 7. This has the advantage that the function of the entire system, for example, a wind power plant, is not impaired during the filling of the tank. Therefore, it is not necessary to move the control element into the safety position in order to fill the tank. The entire system, for example, a wind power plant, can continue to produce power while the tank is being filled. During this process, the control element is secured in any desired position.

The concept of a fluid-based system that comprises at least a control element, a pump and a reservoir, whereby the control element can be affixed in one position while the pump fills the reservoir, is viewed as an independent inventive concept. This concept can thus be used independently of the described fail-safe actuation system. In particular, individual elements or properties of the fail-safe actuation system can be combined in any desired manner with a fluid-based system for securing a control element and filling a reservoir.

The entire fail-safe actuation system can be monitored by means of electronic components. In this manner, an occurrence of a failure state in the working circuit can already be recognized before the total failure of the working circuit. Then the safety circuit can be activated in order to prevent further damage to the working circuit. However, it can also be provided that the assumption of the safety position can be triggered by an external signal, for example, by a remote maintenance system.

Especially preferably, the actuation system is a self-monitored system that, by means of a sensor system, checks and monitors the state of the (high-pressure) tank, of the (low-pressure) reservoir, and of the motor/pump device as well as of the volume of fluid contained in the system. This makes it possible to issue warnings and to carry out condition monitoring as well as to automatically initiate the assumption of the safety position in the failure state.

The amount of fluid used in the actuation system is normally less than 50 liters, preferably less than 20 liters, especially preferably less than 12 liters.

The actuation system is preferably configured as a closed system or as a closed circulation system. The actuation system can be positioned as a compact unit, for example, in the hub of a wind power plant.

The invention claimed is:

1. A fail-safe fluid-based actuation system comprising:
a control element having a first chamber, a second chamber, a third chamber and a safety position;
a working circuit having a motor/pump device and configured and arranged to, in an operative state, selectively communicate fluid to the second chamber and the third chamber to actuate the control element;
a safety circuit having a tank that holds pressurized fluid, an on-off valve for flow between the tank and the first chamber, and a drain valve for flow from the second chamber;
the safety circuit configured and arranged to, in a failure state, automatically move the on-off valve to a through-flow position to connect the tank to the first chamber, move the drain valve to a through-flow position to drain fluid out of the second chamber, and to thereby move the control element into the safety position;
the working circuit and the safety circuit configured and arranged such that, in the failure state, flow from the tank into the first chamber is provided by the safety circuit in a manner that is decoupled from the working circuit motor/pump device;
the working circuit and the safety circuit configured and arranged such that, in the operative state, flow into the third chamber is provided by the working circuit in a manner that is decoupled from the tank;
a filling line and a first valve element between the working circuit and the tank; and
the filling line and first valve element configured and arranged such that fluid from the working circuit can be selectively fed into the tank and such that the tank is decoupled from the working circuit by the first valve element so as to prevent fluid from flowing back into the working circuit.

2. The actuation system according to claim 1, and further comprising a second valve element configured and arranged to, in the failure state, prevent communication between fluid released from the tank and fluid present in the working circuit, thereby completely decoupling the safety circuit from the working circuit.

3. The actuation system according to claim 1, wherein the tank and drain valve are configured and arranged such that, in the failure state, fluid pressure from the tank is available as a control pressure at the drain valve.

4. The actuation system according to claim 1, wherein the on-off valve and the drain valve are configured and arranged such that, in the failure state, the drain valve is forced open by the on-off valve.

5. The actuation system according to claim 1, wherein the safety circuit comprises a drain line in which the drain valve is situated and which is connected to the second chamber, wherein the drain line is decoupled from the tank.

6. The actuation system according to claim 5, wherein the drain line bypasses the working circuit.

7. The actuation system according to claim 5, and further comprising a fluid reservoir and wherein the drain line connects to the reservoir downstream of the second chamber from the drain valve.

8. The actuation system according to claim 7, wherein the working circuit is in fluid communication with the reservoir such that fluid from the reservoir can be conveyed into the working circuit.

9. The actuation system according to one of claim 2, wherein the first valve element is configured and arranged such that, in the operative state and without a volume flow of the motor/pump device, fluid flow from the second and third chambers is prevented.

10. The actuation system according to claim 1, wherein the motor/pump device has a first connecting line and a second connecting line and, in the operative state, one of the connecting lines conveys fluid in a first direction towards the second or third chamber of the control element while the other connecting line conveys fluid from the other of the second or third chamber in a second direction toward the motor/pump device.

11. The actuation system according to claim 10, wherein the motor/pump device has a reversible pumping direction, whereby in a first pumping direction of the motor/pump device, the first connecting line conveys fluid in a first direction towards the second or third chamber of the control element, while the second connecting line conveys fluid from the other of the second or third chamber of the control element in a second direction toward the motor/pump device, and in a second pumping direction, the flow directions in the first and second connecting lines are opposite from the flow directions in the first pumping direction.

12. The actuation system according claim 1, wherein the working circuit comprises a speed-variable constant-displacement pump or a variable-displacement pump.

13. The actuation system according claim 1, and further comprising a wind power plant having a rotor blade and wherein the actuation system controls the angle of attack of the rotor blade.

14. A method for actuating a control element comprising the following steps of:
providing the actuation system set forth in claim 1;
moving the on-off valve to the through-flow position and connecting the tank to the first chamber in a manner that is decoupled from the working circuit and such that fluid flow into the first chamber is established;
moving the drain valve to a through-flow position and draining fluid from the second chamber of the control element;
feeding fluid out of the working circuit into the tank through the filling line; and
preventing a backflow of fluid into the working circuit by means of the first valve element, whereby the tank is decoupled from the working circuit by the first valve element.

15. The method for actuating a control element according to claim 14, and further comprising the step of using the working circuit in the operative state to set the angle of attack of a rotor blade of a wind power plant.

* * * * *